US010310893B2

(12) United States Patent
Bak et al.

(10) Patent No.: US 10,310,893 B2
(45) Date of Patent: Jun. 4, 2019

(54) MANAGING CONTAINER PAUSE AND RESUME

(71) Applicant: Microsoft Technology Licensing, LLC, Redmond, WA (US)

(72) Inventors: Yevgeniy M. Bak, Redmond, WA (US); Lars Reuther, Kirkland, WA (US); Kevin M. Broas, Kirkland, WA (US); Mehmet Iyigun, Kirkland, WA (US); Hari R. Pulapaka, Redmond, WA (US); Morakinyo Korede Olugbade, Seattle, WA (US); Benjamin M. Schultz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 15/189,557

(22) Filed: Jun. 22, 2016

(65) Prior Publication Data
US 2017/0286153 A1 Oct. 5, 2017

Related U.S. Application Data

(60) Provisional application No. 62/318,629, filed on Apr. 5, 2016.

(51) Int. Cl.
*G06F 9/48* (2006.01)
*G06F 9/455* (2018.01)
(Continued)

(52) U.S. Cl.
CPC .......... *G06F 9/485* (2013.01); *G06F 9/45558* (2013.01); *G06F 9/5022* (2013.01); *G06F 9/542* (2013.01); *G06F 2009/45583* (2013.01)

(58) Field of Classification Search
CPC .... G06F 9/485; G06F 9/45558; G06F 9/5022; G06F 9/542; G06F 2009/45583
See application file for complete search history.

(56) References Cited

U.S. PATENT DOCUMENTS 8,725,963 B1 5/2014 Emelianov et al.
8,875,160 B2 10/2014 Hunt et al.
(Continued)

FOREIGN PATENT DOCUMENTS

CN 105204932 A 12/2015

OTHER PUBLICATIONS

"Suspending Container", Published on: Dec. 6, 2008, Available at: http://download.swsoft.com/virtuozzo/virtuozzo4.0/docs/en/lin/VzLinuxUG/17536.htm.
(Continued)

*Primary Examiner* — Jacob D Dascomb

(57) ABSTRACT

An operating system running on a computing device uses containers for hardware resource partitioning. Using the techniques discussed herein, pausing and resuming of containers is managed to reduce the pressure a container exerts on system resources when paused. Resuming of containers can further be managed to reduce the startup time for containers. This managing of containers can implemented various different techniques, such as stopping scheduling of virtual processors, stopping scheduling of processes or threads, compressing memory, swapping pages of memory for the container to a page file on a hard drive, and so forth.

18 Claims, 8 Drawing Sheets

(51) Int. Cl.
*G06F 9/54* (2006.01)
*G06F 9/50* (2006.01)

(56) References Cited

U.S. PATENT DOCUMENTS

| | | |
|---|---|---|
| 8,984,510 B1 | 3/2015 | Emelianov et al. |
| 9,223,596 B1 | 12/2015 | Araujo |
| 2008/0022032 A1 | 1/2008 | Nicholas et al. |
| 2008/0034365 A1 | 2/2008 | Dahlstedt |
| 2009/0089781 A1 | 4/2009 | Shingai et al. |
| 2010/0023942 A1* | 1/2010 | Sheu ............... G06F 9/45558 718/1 |
| 2011/0107331 A1 | 5/2011 | Evans et al. |
| 2012/0036325 A1* | 2/2012 | Mashtizadeh ....... G06F 12/0802 711/118 |
| 2012/0139929 A1* | 6/2012 | Kaza .................. G06L 13/00 345/522 |
| 2012/0222042 A1 | 8/2012 | Chess et al. |
| 2014/0245294 A1 | 8/2014 | Kaul |
| 2014/0366019 A1* | 12/2014 | Bajaj .................... G06F 9/461 718/1 |
| 2015/0378766 A1 | 12/2015 | Beveridge et al. |
| 2016/0055021 A1* | 2/2016 | Beveridge ........... G06F 9/45558 718/1 |
| 2016/0062780 A1* | 3/2016 | Young ................ G06F 9/45558 718/1 |
| 2017/0293762 A1* | 10/2017 | Karhunen ................ G06F 9/54 |

OTHER PUBLICATIONS

"Experiment to Suspend/Resume Docker Container With CRIU", Published on: Jul. 6, 2015, Available at: http://kimh.github.io/blog/en/criu/experiment-to-suspend-and-resume-docker-container-with-criu/.

Medina, et al., "A Survey of Migration Mechanisms of Virtual Machines", In Journal of ACM Computing Surveys, vol. 46, Issue 3, Jan. 2014, 33 pages.

Zhao, et al., "Experimental Study of Virtual Machine Migration in Support of Reservation of Cluster Resources", In Proceedings of the 2nd international workshop on Virtualization technology in distributed computing, Nov. 12, 2007, 8 pages.

Chiang, et al., "Bootstrapped Migration for Linux OS", In Proceedings of the 8th ACM international conference on Autonomic computing, Jun. 14, 2011, pp. 209-212.

KC, et al., "Dynamically controlling node-level parallelism in Hadoop", In Proceedings of IEEE 8th International Conference on Cloud Computing, Jun. 27, 2015, pp. 305-316.

"International Search Report and Written Opinion", Application No. PCT/US2017/024873, dated Jun. 26, 2017, 14 pages.

* cited by examiner

MANAGING CONTAINER PAUSE AND RESUME

RELATED APPLICATIONS

This application claims priority under 35 U.S.C. Section 119(e) to U.S. Provisional Application No. 62/318,629, filed Apr. 5, 2016 and titled "Managing Container Pause And Resume", the entire disclosure of which is hereby incorporated by reference.

BACKGROUND

Operating systems can use hardware resource partitioning to share hardware resources among multiple different virtual machines or containers. While such sharing can increase the number of processes or virtual machines deployed on a device, such sharing is not without its problems. One such problem is that management of hardware resources during such sharing can be difficult, which can degrade the performance of the virtual machines or containers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first request to pause one of multiple containers of a computing device is received. In response to the first request, the container is suspended by no longer scheduling processes in the container for execution. Subsequent to suspending the container, a second request to resume the container is received. In response to the second request, scheduling of processes in the container for execution is resumed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Managing container pause and resume is discussed herein. An operating system running on a computing device, also referred to herein as a host device, uses containers for hardware resource partitioning. In contrast to many virtual machine based approaches, containers allow higher compatibility for programs running in the container, resulting in lower financial costs of program development. Container-based hardware resource partitioning also allows for increased density of programs on a computing device, reducing the facilities, labor, and hardware used to run a particular number of programs.

Container-based hardware resource partitioning typically allows for a fast start time for the container and thus the program(s) running in the container. However, in some scenarios the container start time can still be too slow. As a work around, a container can be started and left in an idle state with no workload actively running. When the container is to run a workload, one of the idle containers (a container that has been started but is not actively running a workload) is used, reducing the time to start the container.

In addition to start times, there exists scenarios where a container receives some of its container specific configuration after its initial start. For example, a cloud service may inject some runtime state that is specific to that container and independent from the image the container was started from. If in this scenario the container is not used to immediately run a workload, the ability to suspend (also referred to as pause) the container frees up system resources.

While the application in the container is not active, each container can exert pressure on system resources (e.g., memory), affecting the performance of running containers and other processes competing for those resources. Using the techniques discussed herein, pausing and resuming of containers is managed to reduce the pressure a container exerts on system resources when paused. Resuming of containers can further be managed to reduce the startup time for containers. This managing of containers can implement various different techniques, such as stopping scheduling of virtual processors, compressing memory, swapping pages of memory for the container to a page file on a hard drive, and so forth.

Figure 1:
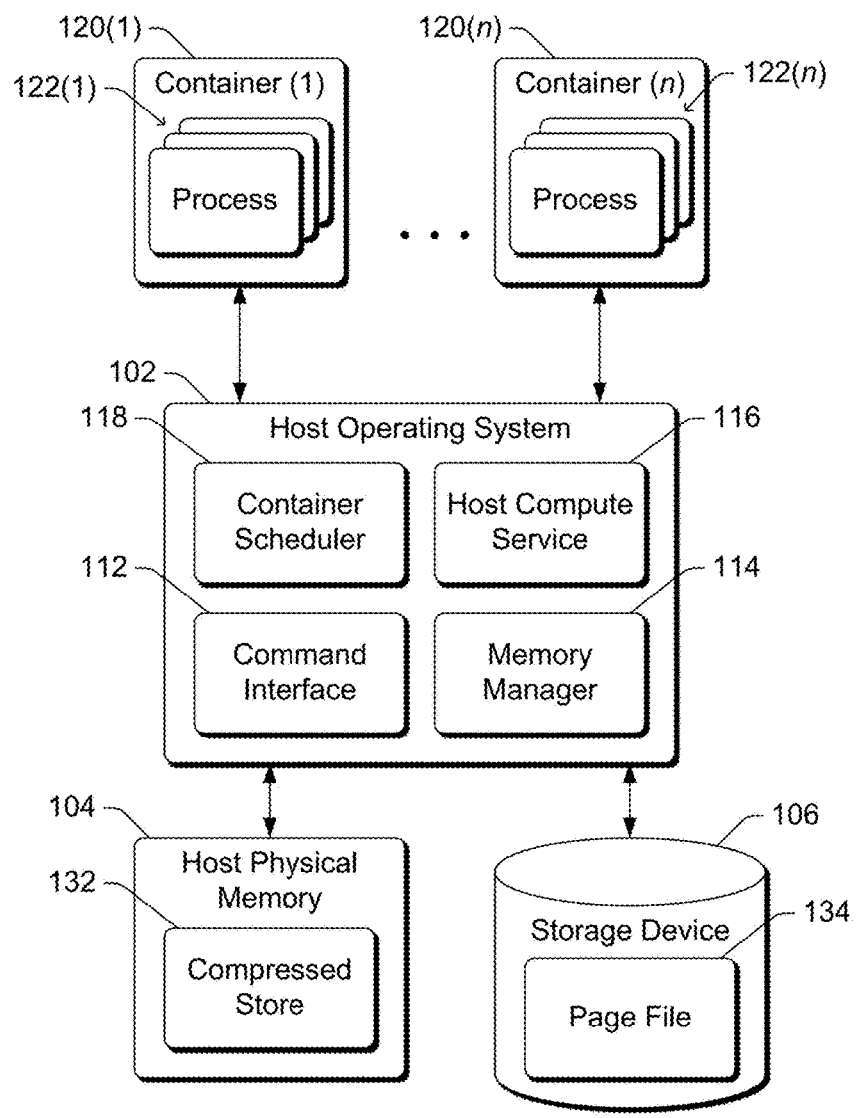
FIG. 1 illustrates an example system implementing the managing container pause and resume in accordance with one or more embodiments.

FIG. 1 illustrates an example system 100 implementing the managing container pause and resume in accordance with one or more embodiments. System 100 is implemented at least in part by a computing device. Any of a variety of different types of computing devices can be used to implement the system 100, such as a server computer, a desktop computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, virtual reality glasses or headset, augmented reality headset or glasses), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the computing device implementing system 100 may range from a full resource device with substantial memory and processor resources (e.g., server computers, personal computers, game consoles) to a low-resource device with limited memory and/or processing resources (e.g., traditional set-top boxes, hand-held game consoles).

The system 100 includes a host operating system 102, a host physical memory 104, and a storage device 106. In one or more embodiments, the host operating system 102, host physical memory 104, and storage device 106 are implemented as part of the same computing device. Alternatively, at least part of the host physical memory 104 and/or storage device 106 can be implemented on a separate device from the device implementing the host operating system 102. For example, the storage device 106 can be implemented as a removable or remote storage device. Such a removable or remote storage device can communicate with the computing device implementing the host operating system 102 using a wired or wireless connection, such as a USB (universal serial bus) connection, a wireless USB connection, an infrared connection, a Bluetooth connection, a DisplayPort connection, a PCI (a peripheral component interconnect) Express connection, and so forth. Such a removable or remote storage device can alternatively or additionally communicate with the computing device implementing the host operating system 102 via a data network, such as the Internet, a local area network (LAN), a public telephone network, an intranet, other public and/or proprietary networks, combinations thereof, and so forth. The removable or remote storage device may alternatively or additionally implement a file server, a distributed filesystem and so forth.

The host operating system 102 includes a command interface 112, a memory manager 114, a host compute service (HCS) 116, and a container scheduler 118. The host operating system 102 also manages multiple (n) containers 120(1), . . . , 120(n). The command interface 112 receives commands to pause and resume containers 120. In one or more embodiments the command interface 112 is an application programming interface (API) that exposes various methods that can be invoked by a program running the system 100, by an administrator or user of the system 100 (e.g. via a user interface exposed by the system 100), and so forth.

The memory manager 114 manages the host physical memory 104 and the storage device 106. The host physical memory 104 is, for example, random access memory (RAM). The storage device 106 can be any of a variety of different types of persistent (e.g., nonvolatile) storage devices, such as a magnetic disk drive, an optical disc drive, a solid-state drive (SSD), and so forth. The memory manager 114 manages the host physical memory 104 as paged memory, allocating portions of the paged memory to programs running on the system 100 (e.g., processes 122 discussed below). Each page is a particular (e.g., fixed) size unit of data.

The container scheduler 118 manages the scheduling of containers 120(1), . . . , 120(n) in the system 100, determining which containers 120(1), . . . , 120(n) are run on the host operating system 102 at what times. Depending on the number of physical processors and/or processor cores in the computing device running the host operating system 102, a single container 120(1), . . . , 120(n) can be run at a time (e.g., in the case of a single processor with a single core) or alternatively multiple containers 120(1), . . . , 120(n) can be run concurrently (e.g., in the case of multiple processors and/or multiple processor cores). Each container 120(1), . . . , 120(n) includes one or more processes 122(1), . . . , 122(n) that perform or carry out the workload for the container.

In one or more embodiments, the container scheduler 118 manages the pausing and resuming of each container 120(1), . . . , 120(n) by scheduling or not scheduling the processes 122 (or threads of the processes 122) in that container. For a container that is paused, the container scheduler 118 does not schedule the processes 122 for that container for execution. For a container that is not paused, the container scheduler 118 does schedule the processes 122 for that container for execution. Thus, it can be seen that when a container is paused no processes in that container are currently executing (because they are not scheduled any execution time), whereas if a container is not paused the processes in that container are currently executing (because they are scheduled execution time).

The host compute service 116 receives an indication of pause and resume commands from the command interface 112, and communicates with the container scheduler 118 and the memory manager 114 to respond to those commands appropriately. A pause command indicates to pause or suspend operation of a particular container 120. The command interface 112 notifies the host compute service 116 of the pause command, and in response the host compute service 116 notifies the container scheduler 118 to cease scheduling processes or threads of that particular container 120. This effectively freezes the current state of that particular container 120—the processes or threads of that particular container 120 are no longer being scheduled and thus cannot change the state of that particular container 120. This ceasing scheduling of the processes or threads of that particular container 120 is also referred to as pausing or suspending the container.

In one or more embodiments, the host compute service 116 also notifies the memory manager 114 of the pause command. In response, the memory manager 114 can perform various operations to reduce the resource usage of that container 120 in the system 100. These operations can reduce, for example, the use of host physical memory 104 by that container 120. Various different operations can be performed to reduce the resource usage of that container 120 in the system 100, such as stopping scheduling of processes or threads, compressing memory, swapping pages of memory for the container to a page file on the storage device 106, combinations thereof, and so forth as discussed in more detail below.

A resume command indicates to resume operation of a particular container 120 that was previously paused or suspended. The command interface 112 notifies the host compute service 116 of the resume command, and in response the host compute service 116 notifies the container scheduler 118 to resume scheduling processes or threads of that particular container 120. In one or more embodiments, the host compute service 116 also notifies the memory manager 114 of the resume command. In response, the memory manager 114 can perform various operations to allow that container to resume operation, effectively undoing or reversing operations performed in response to that container 120 previously being paused or suspended. Various different operations can be performed in response to a resume command, such as decompressing previously compressed memory, swapping pages of memory for the container from a page file on the storage device 106, combinations thereof, and so forth as discussed in more detail below.

In one or more embodiments, the resume command is automated through pre-configuration in the host operating system 102 dependent on a hardware or software trigger. For example, if more containers are needed during prime time, a time of day trigger may be pre-provisioned to trigger one or more containers to resume at 8 PM. Other triggers may include incoming peripheral I/O (such as receiving a network packet), a remote procedure call, and so forth.

The commands to pause and resume can be provided to the command interface 112 at any of a variety of times as desired by the entity providing the command. For example, when a particular operation or function is to be performed by one or more processes in a container 120, an entity (e.g., another application running in the system 100, an administrator, etc.) issues a resume command for the container. When that particular operation or function has been completed, the entity (e.g., another application running in the system 100, an administrator, etc.) issues a pause command for the container 120.

Various other factors or criteria can be used to determine when pause and resume commands are to be provided. In one or more embodiments, these factors or criteria include power transitions in the system 100. For example, if a computing device implementing the system 100 transitions to a low power state (e.g., a connected standby state), a power manager in the system 100 issues one or more pause commands to have the container (optionally all the containers 120 in the system) suspended. Upon transition from the low power state to a higher power state (e.g., a normal or high performance power state), the power manager issues one or more resume commands to have scheduling of processes for the previously paused container(s) resumed.

One operation that can be performed to reduce the resource usage of a particular container 120 in the system 100 in response to a pause or resume command for that particular container 120 is to compress memory for that particular container 120. The physical memory 104 is made up of multiple blocks or portions referred to as memory pages (or simply pages). The memory manager 114 compresses memory pages for the container (e.g., memory pages in the working set for the container) into a compressed store 132 of the host physical memory 104. The memory pages of that container 120 can be repurposed by the memory manager 114 (e.g., and used by other containers) after being compressed into the compressed store 132. The memory manager 114 can use any of a variety of public and/or proprietary compression algorithms or techniques. For example, a memory page can be compressed using run-length encoding compression algorithms, LZW compression algorithms, Huffman coding algorithms, and so forth. Multiple different compression algorithms can optionally be employed, such as different compression algorithms for different types of content. By compressing the memory pages into the compressed store 132 of the host physical memory 104, the amount of physical memory 104 used by that container 120 is reduced. In response to a resume command for that container 120, the memory manager 114 decompresses the previously compressed memory pages into the host physical memory 104.

Another operation that can additionally or alternatively be performed to reduce the resource usage of a particular container 120 in the system 100 in response to a pause or resume command for that particular container 120 is to swap pages of memory for that particular container 120 to a page file 134 on the storage device 106. Swapping pages of memory to the page file 134 refers to storing the data in the memory pages to the page file 134. The memory pages of that container 120 can be repurposed by the memory manager 114 (e.g., and used by other containers) after the data is for those memory pages is stored in the page file 134. By storing the data from the memory pages in the page file 134, the amount of physical memory 104 used by that container 120 is reduced. In response to a resume command for that container 120, the memory manager 114 retrieves the data from the page file 134 and stores the data in the host physical memory 104.

Various additional operations can be performed as part of the swapping of pages for a particular container 120 into the page file 134. In one or more embodiments, the memory pages are compressed prior to being swapped into the page file 134. Thus, the compressed memory pages are swapped into the page file 134 rather than uncompressed memory pages, thereby using a smaller amount of the storage space available in the storage device 106. In response to a resume command for that container 120, the memory manager 114 retrieves the data from the page file 134, decompresses the data, and stores the data in the host physical memory 104.

Additionally or alternatively, the data for the memory pages (whether compressed or uncompressed) is written into the page file 134 in one or more contiguous locations of the page file 134. By writing the data into one or more contiguous locations of the page file 134, in response to a resume command the data can be read in from the page file 134 sequentially, which can increase the speed at which data is read in from the page file 134 compared to non-sequential (e.g., arbitrary access) reads.

Various additional operations can also be performed when compressing memory for a particular container 120, regardless of whether the compressed memory is swapped to the page file 134. For example, the memory manager 114 can combine or de-duplicate memory pages, which refers to identifying multiple memory pages that are the same (e.g., store identical data). A single one of the memory pages can then be maintained (and compressed), and the memory manager 114 can maintain a record that the compressed memory page corresponds to each of the multiple memory pages. This reduces the amount of compressed memory and/or page file space consumed by the compressed memory pages.

By way of another example, decompression of memory pages for the particular container 120 can be performed in parallel by multiple processors and/or processor cores. E.g., different processors and/or processor cores can decompress different memory pages for the particular container 120 concurrently. This allows the memory pages for the particular container 120 to be decompressed more quickly and increases the speed at which the container 120 can be resumed. In one or more embodiments, all available processor resources are used to decompress memory pages.

By way of another example, the memory manager 114 can re-assign memory pages that were assigned to a paused container 120 to another container 120. This reduces the amount of memory that is assigned to the paused container 120. When the paused container 120 resumes, the memory manager 114 recovers the memory pages for that container 120 (e.g., regaining the previously re-assigned memory pages, or having memory pages from another container 120 re-assigned to the container 120 being resumed).

Which operations are performed to reduce the resource usage of a particular container 120 in the system 100 in response to a pause or resume command for that particular container 120 can be determined in a variety of different manners. In one or more embodiments, the user, program, or other entity that provides the pause command to the command interface 112 also provides an indication of the level or type of pause they desire to have performed. This indication can be provided along with the pause command (e.g., as a parameter of the pause command) or can otherwise be associated with the container 120 being paused. The host operating system 102 (e.g., the host compute service 116 and/or memory manager 114) determines, based on the indication of the desired level of pause, which operations to perform.

Various different levels of pause can be supported by the host operating system 102, with deeper or higher levels of pause resulting in different overhead as well as quicker freeing or more freeing of resources used by the container 120 but can result in longer times to resume the container 120 than shallower or lower levels of pause. For example, one level of pause may be to suspend the processes or threads of the container 120 but not compress the memory pages of the container 120 or write the memory pages of the container 120 to a page file. This level of pause would quickly free usage of the hardware processors because the processes or threads are not being scheduled, and can be quickly resumed because scheduling of the processes or threads need simply be resumed. Another, deeper, level of pause may be to suspend the processes or threads of the container 120, compress the memory pages of the container 120, and write the compressed memory pages of the container 120 to a page file. This level of pause would quickly free usage of the hardware processors because the processes or threads are not being scheduled and would free more memory because memory pages are being compressed and written to a page file. However, resuming the container would be more time consuming due to the time taken to read the memory pages from the page file and decompress the memory pages. The level of pause to use is determined on a per container basis, allowing different levels of pause to be applied to different containers.

Additionally or alternatively, which operations are performed to reduce the resource usage of a particular container 120 in the system 100 in response to a pause or resume command for that particular container 120 can be determined in other manners. For example, the user, program, or other entity that provides the pause command to the command interface 112 can also provide an indication of the particular operations to be performed. By way of another example, the host operating system 102 may be configured with particular operations that are performed for all containers 120 (or default operations that are performed unless other operations are indicated by a particular container 120).

In one or more embodiments, the operations that are performed to reduce the resource usage of a particular container 120 in the system 100 in response to a pause or resume command for that particular container 120 are determined at least in part by the host operating system 102 (e.g., the host compute service 116 and/or memory manager 114) automatically. This automatic determination can be made in conjunction with an indication provided along by the user (e.g., an administrator), program, or other entity that provides the pause command to the command interface 112, or independently of such an indication. The host operating system 102 uses various different criteria, rules, or other techniques to determine which operations to perform.

In one or more embodiments, the automatic determination is resource based. Resources of the system 100 (e.g., memory consumption) are monitored and different operations performed based on the resource usage (also referred to as resource utilization). The resource usage can be resource usage across the system 100, or on a per container basis (e.g., an amount of resources a particular container uses). Various actions can be taken (e.g., the appropriate level of pause determined) based on various factors, such as based on container idle time (e.g., an amount of time since the container 120 was last paused), container resource usage (e.g., an amount of memory or other resources used or assigned to the container 120), and/or system resource utilization (e.g., an amount of memory or other resources being used in the system. For example, a container 120 may be paused in response to a pause command but no other action taken until a particular event occurs (e.g., memory consumption exceeds a threshold level or percentage of the host physical memory 104, a threshold amount of time elapses since the container 120 was last paused, at least a threshold amount of resources are expected or requested for use by another container 120). In response to the particular event, memory pages of the container 120 are compressed into the compressed store 132. Additional actions can be taken if additional events occur (e.g., memory consumption exceeds another (e.g., higher) threshold level or percentage of the host physical memory 104, another (e.g., longer) threshold amount of time elapses since the container 120 was last paused, at least a threshold amount of resources are expected or requested for use by another container 120). In response to the additional event(s), compressed memory pages of the container 120 are written to the page file 134.

In one or more embodiments, the host operating system 102 (e.g., the host compute service 116 and/or memory manager 114) also implements various different techniques to determine which operations are performed on which containers 120(1), . . . , 120(n). Various different rules or criteria can be used to identify which operations are to be performed on which containers 120(1), . . . , 120(n), such as which container is to have its memory pages compressed, which container 120 is to have its memory pages written to the page file, and so forth. These rules or criteria can include, for example, a least recently used (LRU) criteria so that the memory pages of the least recently used container 120 are operated on (e.g., compressed and/or written to a page file) prior to a more recently used container 120. Different rules or criteria can also be used, such as a least frequently used criteria so that the memory pages of the least frequently used container 120 (over some duration of time, such as the preceding hour, the preceding day, etc.) are operated on (e.g., compressed and/or written to a page file) prior to a more frequently used container 120, a container priority criteria so that the memory pages of a lower priority container 120 (e.g., as specified by a user, administrator, or other entity requesting that containers be paused) are operated on (e.g., compressed and/or written to a page file) prior to a higher priority container 120, and so forth.

The containers 120(1), . . . , 120(n) can be implemented in different manners. Each of the containers 120(1), . . . , 120(n) can be implemented in the same manner, or alternatively different ones of the containers 120(1), . . . , 120(n) can be implemented in different manners.

One type of container that a container 120 can be implemented as is referred to as a process container. For a process container 120, the processes 122 run as if they were operating on their own individual system (e.g., computing device), which is accomplished using namespace isolation. Host operation system 102 implements namespace isolation. Namespace isolation provides processes in a container a composed view consisting of the shared parts of host operating system 102 and the isolated parts of the operating system that are specific to each container such as filesystem, configuration, network, and so forth.

In one or more embodiments, such process containers do not include a virtual processor. The host compute service 116, memory manager 114, and container scheduler 118 treat the processes included in the process container (as well as the threads thereof) as a group. This group of processes can also be referred to as a workload. In response to a pause command, all of the processes included in the process container are suspended and the container scheduler 118 ceases scheduling of the processes on the physical processor of the system 100. In response to a resume command, all of the processes included in the process container are resumed and the container scheduler 118 resumes scheduling of those processes on the physical processor of the system 100. The various operations discussed herein as being performed to reduce the resource usage of a particular container 120 in the system 100 in response to a pause or resume command for that particular container 120 are performed on the processes of the process container as a group. For example, the memory pages for all of the processes of the process container may be compressed into the compressed store 132, the compressed memory pages for all of the processes of the process container may be written into the page file 134, and so forth.

Another type of container that a container 120 can be implemented as is referred to as a virtualized container. For a virtualized container 120, the virtualized container 120 is run in a lightweight virtual machine that, rather than having specific host physical memory 104 assigned to the virtual machine, has virtual address backed memory pages. Thus, the memory pages assigned to the virtual machine can be compressed and/or swapped out to a page file as discussed above. The use of a lightweight virtual machine provides additional security and isolation between processes running in a container. Thus, whereas process containers use process isolation or silo-based process isolation to achieve their containment, virtualized containers use virtual machine based protection to achieve a higher level of isolation beyond what a normal process boundary can provide.

For a virtualized container, the virtualized container appears as one process to the memory manager 114. The memory pages of the processes running in that virtualized container are part of the one process for the virtualized container, so the various operations discussed herein as being performed to reduce the resource usage of a particular container 120 in the system 100 in response to a pause or resume command for that particular container 120 are performed on the one process for the virtualized container. The operations are thus performed on all of the processes in the one process for the virtualized container.

Additionally, the virtualized container includes one or more virtual processors (also referred to as a virtual CPU (central processing unit)). A process 122 runs on a virtual processor of the virtualized container as if the virtual processor were a physical processor, although the virtual processor is a software implementation of (e.g., software emulation of) a hardware processor and is controlled by the host operating system 102.

In one or more embodiments, the container scheduler 118 manages the pausing and resuming of each container 120(1), ..., 120(n) by scheduling or not scheduling the virtual processors in that container. For a container that is paused, the container scheduler 118 does not schedule the virtual processor for that container for execution—the virtual processors for that container are thus not scheduled to run on the physical processors of the system 100, and thus any process in that container also is not scheduled to run. For a container that is not paused, the container scheduler 118 does schedule the virtual processor for that container for execution—the virtual processors for that container are thus scheduled to run on the physical processors of the system 100, and thus any process in that container is scheduled to run on the virtual processors in that container. Thus, it can be seen that when a virtualized container is paused no processes in that container are currently executing (because they are not scheduled any execution time), whereas if a virtualized container is not paused the processes in that container are currently executing (because they are scheduled execution time).

In one or more embodiments, for virtualized containers various additional operations can be performed to reduce the resource usage of a particular virtualized container in response to a pause or resume command for that virtualized container. For example, in some situations, a SLAT (second level address table) is maintained for the virtualized container. In response to a request to resume the virtualized container, the SLAT is pre-filled, thereby reducing the number of virtual faults that may otherwise be encountered to get the memory pages into the SLAT, and increasing the speed at which the virtualized container can be resumed.

Regardless of the type of container used, the techniques discussed herein provide pause and resume management of the containers. However, it should be noted that the manner in which the techniques are implemented can vary based on the type of containers (e.g., virtual processors are suspended in situations in which virtualized containers are used, and threads of processes associated with a container are suspended in situations in which process containers are used). When work is to be done by a container 120 (e.g., one or more processes in the container 120 are to run to perform one or more operations) that has been paused, the container 120 can be resumed quickly and efficiently so that the work can be done. When no work is to be performed by the container 120 (e.g., no processes in the container 120 need be run), the system resource charges are reduced.

In accordance with one or more aspects, the system 100 supports and/or includes methods and components that perform the following example techniques and/or operations. Suspending running of a container, freezing its current state, and (1) eliminating container processor consumption by no longer scheduling threads belonging to the container, (2) mitigating memory resource contention resulting from the container by removing the container working set from active physical memory to a compressed store in physical memory, and/or (3) mitigating memory resource contention resulting from the container by removing the container working set from physical memory to a page file on a persistent storage medium. The system 100 also supports providing a heuristic to the host operating system 102, the heuristic uses a Least Recently Used algorithm which marks pages in the working set of suspended containers as primary candidates for eviction to the page file in the case of memory pressure.

The system 100 also supports monitoring system memory (e.g., host physical memory 104) consumption. A determination is made as to whether the system exceeds a threshold memory consumption, and if so, the pages in the working set of some or all of suspended containers are optionally written to the page file in a way that allows for sequential reading upon resumption of the container. Additionally, if the pages are written to the page file in a way that allows for sequential reading upon resumption of the container, the system 100 supports determining an order in which the container's working set is written to the page file, based on service and system configuration. Additionally, if the pages are written to the page file in a way that allows for sequential reading upon resumption of the container, the system 100 supports, after a container's working set memory has been written out to the page file and the system memory usage goes below a certain threshold, swapping the working set of the container back into the host physical memory 104 before the container has been resumed.

The system 100 also supports compressing container memory (e.g., the container's working set) in a store shared by multiple containers. The system 100 also supports sharing compressed sections of container memory across containers with redundant portions of memory that are compressed. If sections of container memory (e.g., shared pages) are shared by multiple containers, the shared pages need be compressed only once and each container can reference the same compressed shared pages (rather than the shared pages being compressed and stored multiple times, once for each container).

The system 100 also supports resuming a suspended container, returning the container to its previous running state. The system 100 also supports scheduling container threads, allowing execution of processes and threads of a paused container from the previous state (the state of the container at the time the container was paused). The system 100 also supports, if a suspended container's working set has been written out to the page file, returning the pages of the container working set back into memory through a sequential read in order to do so as quickly as possible.

Figure 2:
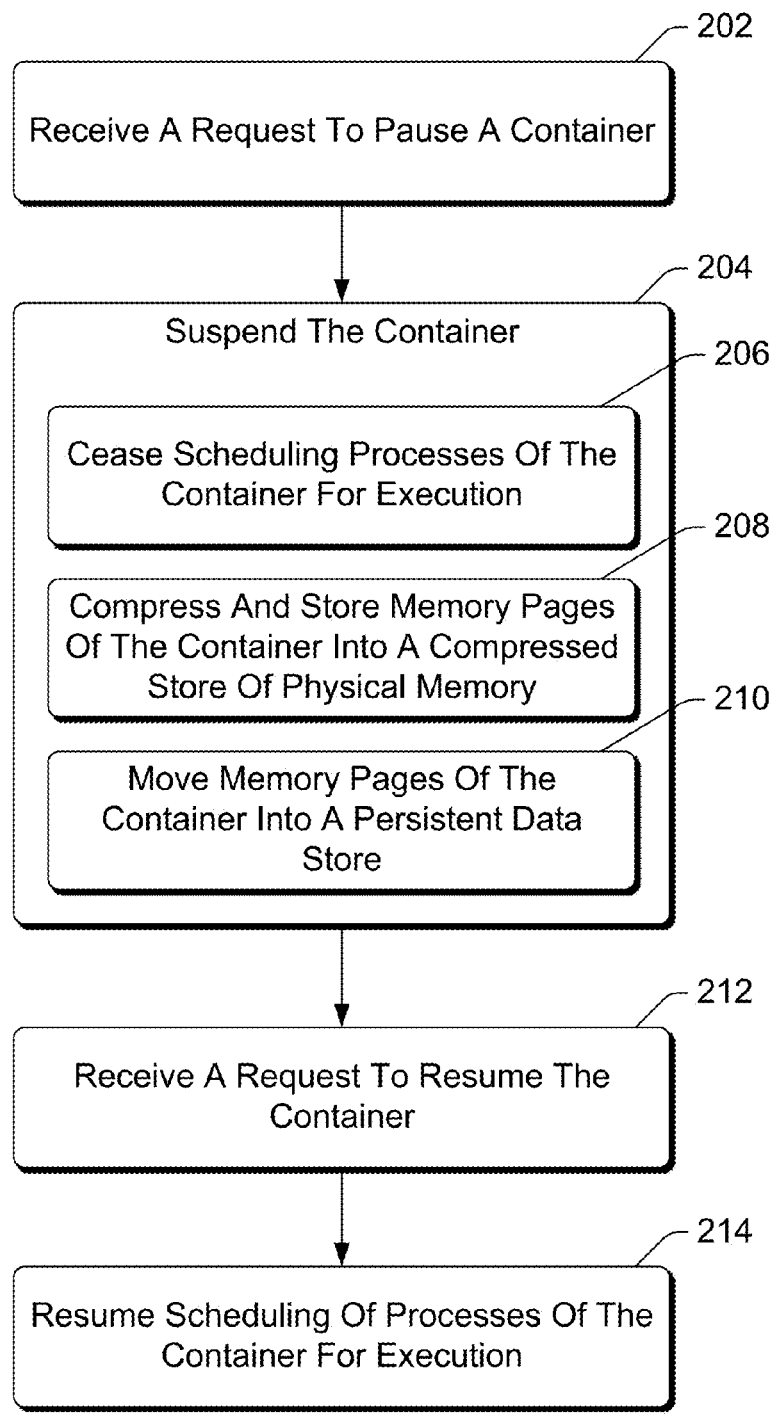
FIG. 2 is a flowchart illustrating an example process for managing container pause and resume in accordance with one or more embodiments.

FIG. 2 is a flowchart illustrating an example process 200 for managing container pause and resume in accordance with one or more embodiments. Process 200 is carried out by a system, such as system 100 of FIG. 1, and can be implemented in software, firmware, hardware, or combinations thereof. Process 200 is shown as a set of acts and is not limited to the order shown for performing the operations of the various acts. Process 200 is an example process for managing container pause and resume; additional discussions of managing container pause and resume are included herein with reference to different figures.

In process 200, a request to pause a container is received (act 202). The request can be received from a user, administrator, program, or other entity as discussed above. The container can be various different types of containers. For example, the container can be a process container for which an operating system of the computing device isolates the container from others of the multiple containers using namespace isolation, or the container can be a virtualized container that is run as a lightweight virtual machine with virtual address space backed memory.

In response to the request to pause the container, the container is suspended (act 204). Suspending the container includes suspending scheduling of processes of the container (processes run in the container) for execution (act 206). This suspension can be performed by suspending the processes of the container as a group, or suspending a virtual processor of the container as discussed above.

Suspending the container in act 204 optionally includes various additional operations. For example, suspending the container can include compressing and storing memory pages of the container into a compressed store of physical memory (act 208). In act 208, memory resource contention in the computing device resulting at least in part from the container is reduced by removing the container working set from active physical memory to a compressed store in physical memory.

By way of another example, suspending the container can include moving memory pages (compressed or uncompressed) of the container into a persistent data store (act 210). In act 210, memory resource contention in the computing device resulting at least in part from the container is reduced by removing the container working set from physical memory to a page file on a persistent storage medium.

A request to resume the container is received (act 212). The request to resume the container is received after receipt of the request to pause the container, and optionally after the container has been suspended.

In response to the request to resume the container, the scheduling of processes of the container for execution is resumed (act 214). Various additional operations can also be performed as discussed above, such as decompressing memory pages, retrieving memory pages from a page file, and so forth.

Figure 3:
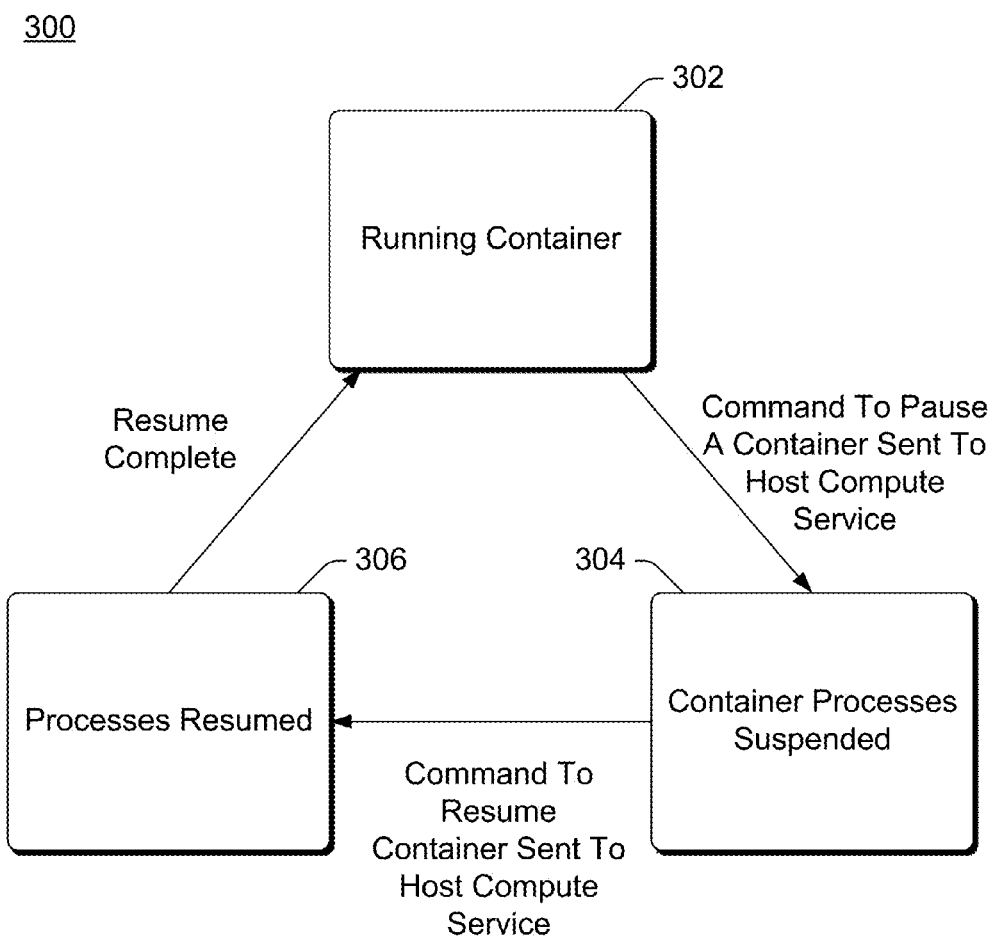
FIG. 3 illustrates an example state machine in accordance with one or more embodiments.

FIG. 3 illustrates an example state machine 300 in accordance with one or more embodiments. The state machine 300 illustrates an example of different states that the host operating system 102 of FIG. 1 transitions through in managing container pause and resume. The state machine 300 includes a running container state 302, a container processes suspended state 304, and a processes resumed state 306.

In the running container state 302, the container is running and processes of the container are scheduled for execution. In the container processes suspended state 304, processes of the container are suspended and are not scheduled for execution. This can be accomplished by suspending the virtual processor(s) that execute the processes of the container, or suspending the processes/threads of the container as a group as discussed above. In the processes resumed state 306, the scheduling of the processes of the container for execution is resumed. This can be accomplished by resuming scheduling of the virtual processor(s) that execute the processes of the container, or resuming the processes/threads of the container as a group as discussed above.

In the state machine 300, the system begins, for example, in the running container state 302. A call is made through the command interface to suspend a container. The call is forwarded to the host compute service, which interfaces with system components. The host compute service issues a call to the container scheduler that is responsible for scheduling the container virtual processors (or processes/threads of the container) and issues a request to stop scheduling the virtual processors (or processes/threads of the container), and the state machine 300 transitions to the container processes suspended state 304. The virtual processors (or processes/threads of the container) of the container are suspended so that processes of the container are no longer scheduled. A completion notification is optionally sent (e.g., to the requester that initiated the pause command).

A call is subsequently made through the command interface to resume the container. The host compute service makes a call to the container scheduler to resume scheduling of the container virtual processors (or processes/threads of the container), and the state machine transitions to the processes resumed state 306. The resumption of the container virtual processors (or processes/threads of the container) completes, the state machine transitions to the running container state 302, and the container is resumed.

Figure 4:
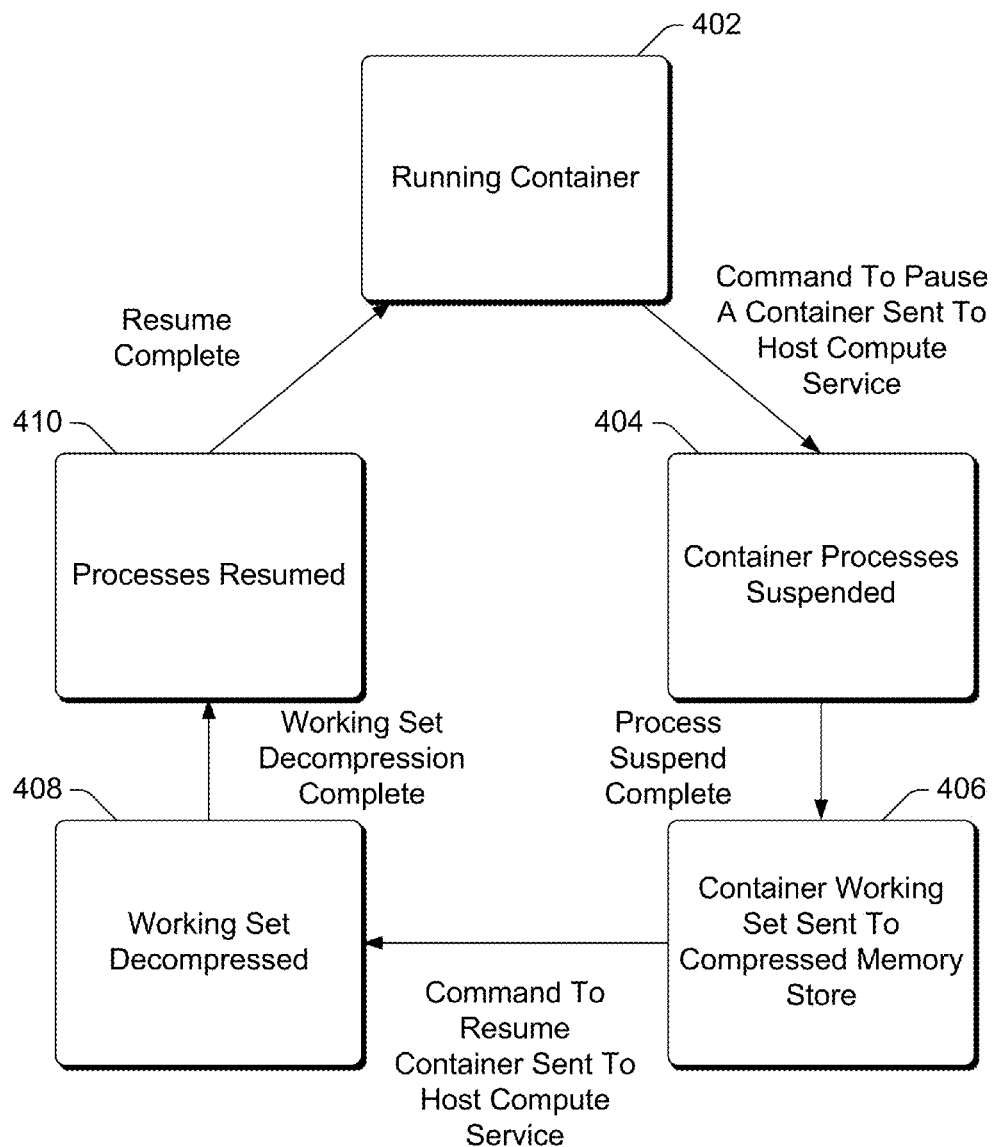
FIG. 4 illustrates another example state machine in accordance with one or more embodiments.

FIG. 4 illustrates an example state machine 400 in accordance with one or more embodiments. The state machine 400 illustrates an example of different states that the host operating system 102 of FIG. 1 transitions through in managing container pause and resume. The state machine 400 includes a running container state 402, a container processes suspended state 404, a container working set sent to compressed memory store state 406, a working set decompressed state 408, and a processes resumed state 410.

In the running container state 402, the container is running and processes of the container are scheduled for execution. In the container processes suspended state 404, processes of the container are suspended and are not scheduled for execution. This can be accomplished by suspending the virtual processor(s) that execute the processes of the container, or suspending the processes/threads of the container as a group as discussed above. In the container working set sent to compressed memory store state 406, memory pages of the container are compressed and saved in the compressed store of the host physical memory. In the working set decompressed state 408, the previously compressed memory pages are decompressed. In the processes resumed state 410, the scheduling of the processes of the container for execution is resumed. This can be accomplished by resuming scheduling of the virtual processor(s) that execute the processes of the container, or resuming the processes/threads of the container as a group as discussed above.

In the state machine 400, the system begins, for example, in the running container state 402. A call is made through the command interface to suspend a container. The call is forwarded to the host compute service, which interfaces with system components. The host compute service issues a call to the container scheduler that is responsible for scheduling the container virtual processors (or processes/threads of the container) and issues a request to stop scheduling the virtual processors (or processes/threads of the container), and the state machine 400 transitions to the container processes suspended state 404. The virtual processors (or processes/threads of the container) of the container are suspended so that processes of the container are no longer scheduled. A completion notification is optionally sent (e.g., to the requester that initiated the pause command).

In response to completion of suspending the virtual processors (or processes/threads of the container), the state machine 400 transitions to the container working set sent to compressed memory store state 406. The memory manager compresses the working set of the container (e.g., a process that represents the container and hosts the container memory, or the processes of the container), and sends the compressed working set to a compressed store shared by all containers. If possible, sharing occurs (e.g., de-duplicating of memory pages) and fewer copies of compressed memory are needed. Container pause is then complete.

A call is subsequently made through the command interface to resume the container, and the state machine 400 transitions to the working set decompressed state 408. The host compute service makes a call to the memory manager to decompress the pages of the container working set. Decompression completes and the memory manager places the pages of the container working set into physical memory, and sends a completion notification to the host compute service.

The host compute service makes a call to the container scheduler to resume scheduling of the container virtual processors (or processes/threads of the container), and the state machine transitions to the processes resumed state 406. The resumption of the container virtual processors (or processes/threads of the container) completes, the state machine transitions to the running container state 402, and the container is resumed.

Figure 5:
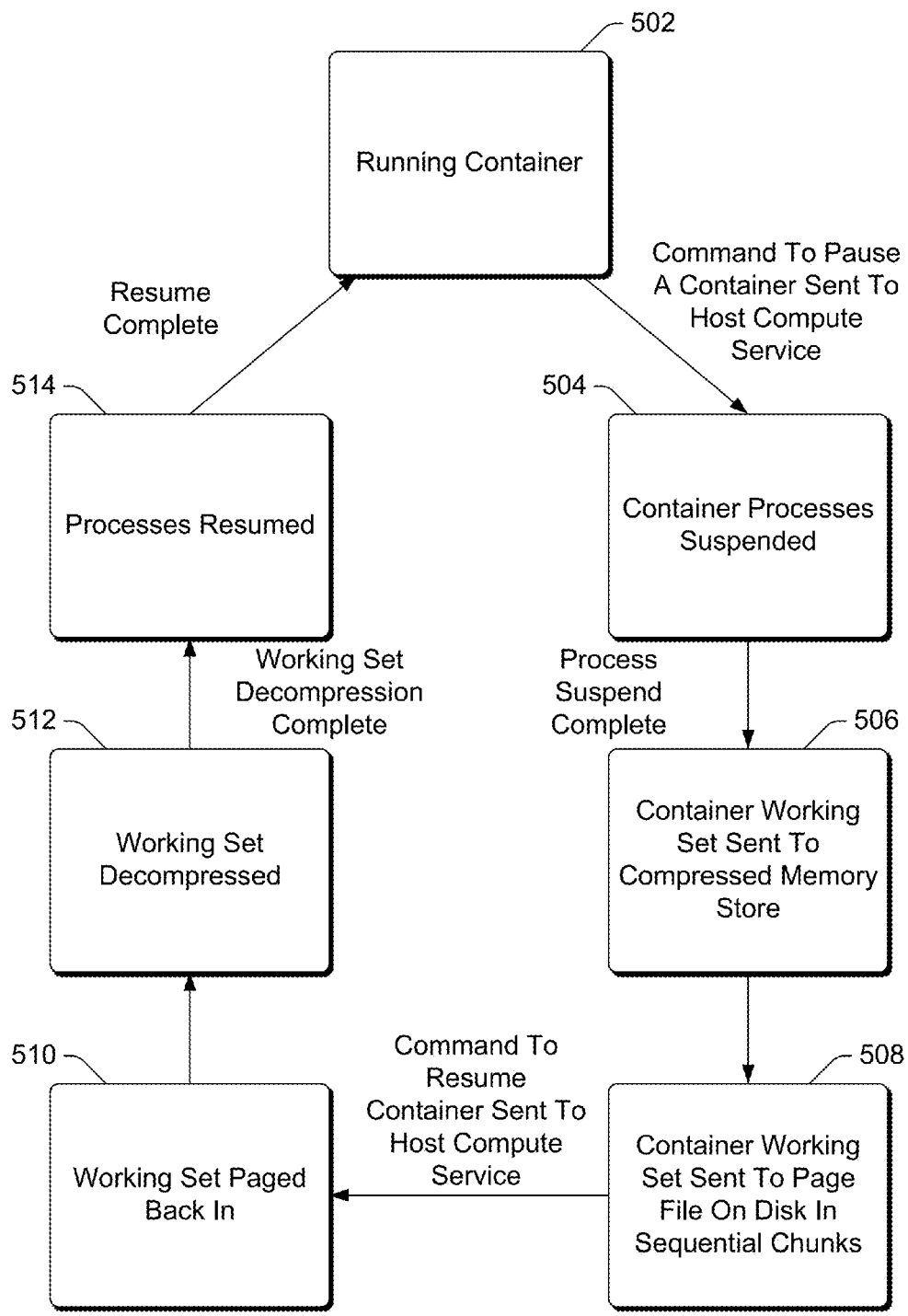
FIG. 5 illustrates another example state machine in accordance with one or more embodiments.

FIG. 5 illustrates an example state machine 500 in accordance with one or more embodiments. The state machine 500 illustrates an example of different states that the host operating system 102 of FIG. 1 transitions through in managing container pause and resume. The state machine 500 includes a running container state 502, a container processes suspended state 504, a container working set sent to compressed memory store state 506, a container working set sent to page file on disk in sequential chunks state 508, a working set paged back in state 510, working set decompressed state 512, and a processes resumed state 514.

In the running container state 502, the container is running and processes of the container are scheduled for execution. In the container processes suspended state 504, processes of the container are suspended and are not scheduled for execution. This can be accomplished by suspending the virtual processor(s) that execute the processes of the container, or suspending the processes/threads of the container as a group as discussed above. In the container working set sent to compressed memory store state 506, memory pages of the container are compressed and saved in the compressed store of the host physical memory. In the container working set sent to page file on disk in sequential chunks state 508, memory pages of the container are saved (e.g., from the compressed store) to a page file on a persistent storage device in sequential chunks. In the working set paged back in state 510, the memory pages previously written to the page file are read back in (and optionally decompressed). In the working set decompressed state 512, the previously compressed memory pages are decompressed. In the processes resumed state 514, the scheduling of the processes of the container for execution is resumed. This can be accomplished by resuming the virtual processor(s) that execute the processes of the container, or resuming the processes/threads of the container as a group as discussed above.

In the state machine 500, the system begins, for example, in the running container state 502. A call is made through the command interface to suspend a container. The call is forwarded to the host compute service, which interfaces with system components. The host compute service issues a call to the container scheduler that is responsible for scheduling the container virtual processors (or processes/threads of the container) and issues a request to stop scheduling the virtual processors (or processes/threads of the container) and the state machine 500 transitions to the container processes suspended state 504. The virtual processors (or processes/threads of the container) of the container are suspended so that processes of the container are no longer scheduled. A completion notification is optionally sent (e.g., to the requester that initiated the pause command).

In response to completion of suspending the virtual processors (or processes/threads of the container), the state machine 500 transitions to the container working set sent to compressed memory store state 506. The memory manager compresses the working set of the container (e.g., a process that represents the container and hosts the container memory, or the processes of the container), and sends the compressed working set to a compressed store shared by all containers. If possible, sharing occurs (e.g., de-duplicating of memory pages) and fewer copies of compressed memory are needed. The state machine 500 then transitions to the container working set sent to page file on disk in sequential chunks state 508. The memory manager writes the set (e.g., the working set) of the container (e.g., a process that represents the container and hosts the container memory, or the processes of the container) to the page file in one or more contiguous portions (e.g., the largest contiguous portion(s) possible). The set of memory pages is optionally compressed prior to being written to the page file. Container pause is then complete.

A call is subsequently made through the command interface to resume the container, and the state machine 500 transitions to the working set paged back in state 510. The host compute service makes a call to the memory manager to read the pages of the container working set from the page file. The memory manager reads the memory pages from the page file and places the pages of the container working set into physical memory (e.g., a compressed store of the physical memory), and sends a completion notification to the host compute service. The state machine then transitions to the working set decompressed state 512.

The host compute service makes a call to the memory manager to decompress the pages of the container working set. Decompression completes and the memory manager places the pages of the container working set into physical memory, and sends a completion notification to the host compute service. The host compute service makes a call to the container scheduler to resume scheduling of the container virtual processors (or processes/threads of the container), and the state machine transitions to the processes resumed state 514. The resumption of the container virtual processors (or processes/threads of the container) completes, the state machine transitions to the running container state 502, and the container is resumed.

The state machine 500 is discussed with reference to compressing memory pages prior to saving the memory pages to the page file. Alternatively, the container working set can be sent to the page file without being compressed. In such situations, the state machine 500 need not include the container working set sent to compressed memory store state 506; rather, the state machine 500 transitions from the container processes suspended state 504 to the container working set sent to page file on disk in sequential chunks state 508 where uncompressed memory pages are written to the page file. Similarly, the state machine need not include the working set decompressed state 512; rather, the state machine 500 transitions from the working set paged back in state 510 where uncompressed memory pages are written back in to physical memory (not to a compressed store of physical memory) to the processes resumed state 514.

Additional discussion of compressing memory pages, writing memory pages to a page file, and reading memory pages from a page file is included in the following. It should be noted that the following discussion includes examples of compressing memory pages, writing memory pages to a page file, and reading memory pages from a page file, and that other techniques for compressing memory pages, writing memory pages to a page file, and/or reading memory pages from a page file can additionally or alternatively be used.

The host physical memory 104 includes multiple pages that can each be classified as one of multiple different types of pages at any given time, and this classification can change over time. One type of memory page is a memory page that has been allocated to a process and is currently being used by the process, and this type of memory page is referred to as a working set page (or alternatively an assigned page) in the working set of the process. The working set of a container refers to the memory pages that have been allocated to a process of that container (and/or a virtual machine that is running the container). A memory page currently being used refers to a memory page that has been accessed by the process within a threshold amount of time (e.g., the previous 20 seconds), or is otherwise being accessed by the process in such a manner that the memory page is not to be repurposed by the memory manager 114. Repurposing a memory page refers to the memory page being re-used by the memory manager 114 for something else, such as storing different data for the same or a different process or for other use in the system.

Another type of memory page is a memory page that has been allocated to a process and is not currently being used by the process, and this type of memory page is referred to as a standby page (or alternatively a re-assignable page). A memory page not currently being used refers to a page the contents of which have not been modified (or has been written to the page file 134) and that has not been accessed by the process within a threshold amount of time (e.g., the previous 20 seconds), or is otherwise being accessed by the process in such a manner that the memory page can be repurposed by the memory manager 114. A memory page can be repurposed by, for example, being assigned to be a different type of page (e.g., working), being allocated to a different process, and so forth.

Another type of memory page is a memory page the contents of which have been modified but not yet copied to the page file 134, and this type of memory page is referred to as a modified page (or alternatively a dirty page). A modified memory page is not to be repurposed by the memory manager 114.

Another type of memory page is a memory page that is not currently allocated to a process, and with which the memory manager 114 can do anything (including being repurposed). This type of memory page is referred to as a free page (or alternatively de-allocated page).

The memory manager 114 uses various rules or criteria to determine when memory pages of the physical memory 104 are allocated to which processes and/or containers, which memory pages previously allocated to a process and/or container are to be repurposed, and so forth. The memory manager 114 also determines the classification for types of memory pages, changing the classifications of memory pages as appropriate. In one or more embodiments, the memory manager 114 maintains a list or other record of which memory pages of the physical memory 104 are classified as which type of page. For example, the memory manager 114 can maintain a list or other record of working set pages, a list or other record of standby pages, a list or record of modified pages, a list or record of free pages, and so forth.

In one or more embodiments, the memory manager 114 compresses pages of the physical memory 104 and stores the compressed pages in a region of the compressed store 132, also referred to as compressing the memory pages into the compressed store 132 or into the region of the compressed store 132. The memory manager uses a single compressed store 132 that is shared by the multiple containers 120(1), . . . , 120(n). Alternatively, the memory manager 114 can generate a separate compressed store for each container 120(1), . . . , 120(n).

Thus, the memory manager 114 compresses a particular set of pages into a different set of pages of the same type (e.g., modified). However, as the memory manager 114 compresses that particular set of pages, the quantity of pages in that particular set of pages is typically greater than the quantity of pages in the compressed set of pages.

Figure 6:
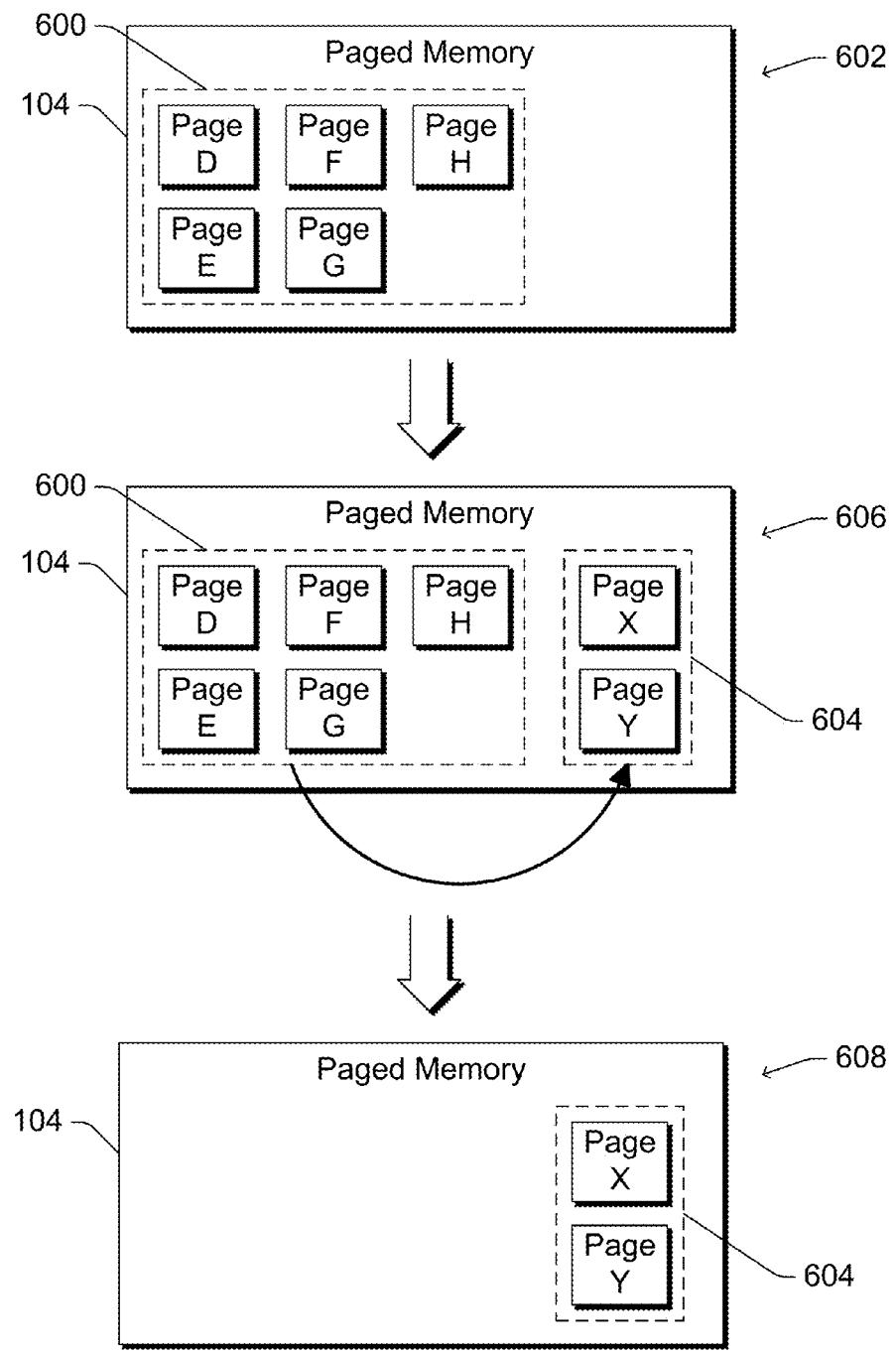
FIG. 6 illustrates an example of compressing memory pages in accordance with one or more embodiments.

FIG. 6 illustrates an example of compressing memory pages in accordance with one or more embodiments. The paged memory 106 includes five memory pages 600 as illustrated at 602. The memory manager 114 compresses the memory pages 600 into the memory pages 604, as illustrated at 606. After compression, the memory manager 114 can repurpose the memory pages 600 because the compressed version of the memory pages 600 are stored in the paged memory 104 as memory pages 604. Thus, after compression the paged memory 104 stores the memory pages 604 but need not store the memory pages 600, as illustrated at 608.

The set of memory pages 600 can be moved, for example, to the standby list (or the free list) after being compressed into the compressed store. The set of memory pages 600 can be repurposed because two versions of the same memory page (one version being uncompressed and one version being compressed) need not be kept in paged memory.

In one or more embodiments, each memory page has an identifier (which may also referred to as a key) associated with it that allows the memory pages to be distinguished from one another. This identifier can be assigned by any of various components, such as the memory manager 114. The compressed version of a memory page takes up less space in the physical memory 104 than the memory page itself, so the memory manager 114 can manage the physical memory 104 by memory pages, and also maintain a memory page map to identify in which regions of compressed store 132 the various compressed memory pages are stored. The memory manager 114 maintains a record of mappings between memory pages and regions of the compressed store 132. This record allows the memory manager 114 to identify where in the compressed store 132 a compressed version of a memory page is located, and/or allows the memory manager 114 to identify which uncompressed memory page a particular portion or region of the compressed store 132 corresponds to (contains a compressed version of).

As discussed above, situations can arise in which the memory pages for a container (e.g., the entire working set for a container 120) are written to the page file 134. The memory pages can optionally be compressed prior to being written to page file as discussed above. The memory pages can also optionally be written to the page file 134 in one or more contiguous chunks, so that memory pages of the container are swapped to a page file on a persistent storage medium sequentially. The memory pages written to the page file 134 can be compressed memory pages (e.g., written from the compressed store 132) or uncompressed memory pages (e.g., written from portions of the host physical memory 104 other than the compressed store 132).

Figure 7:
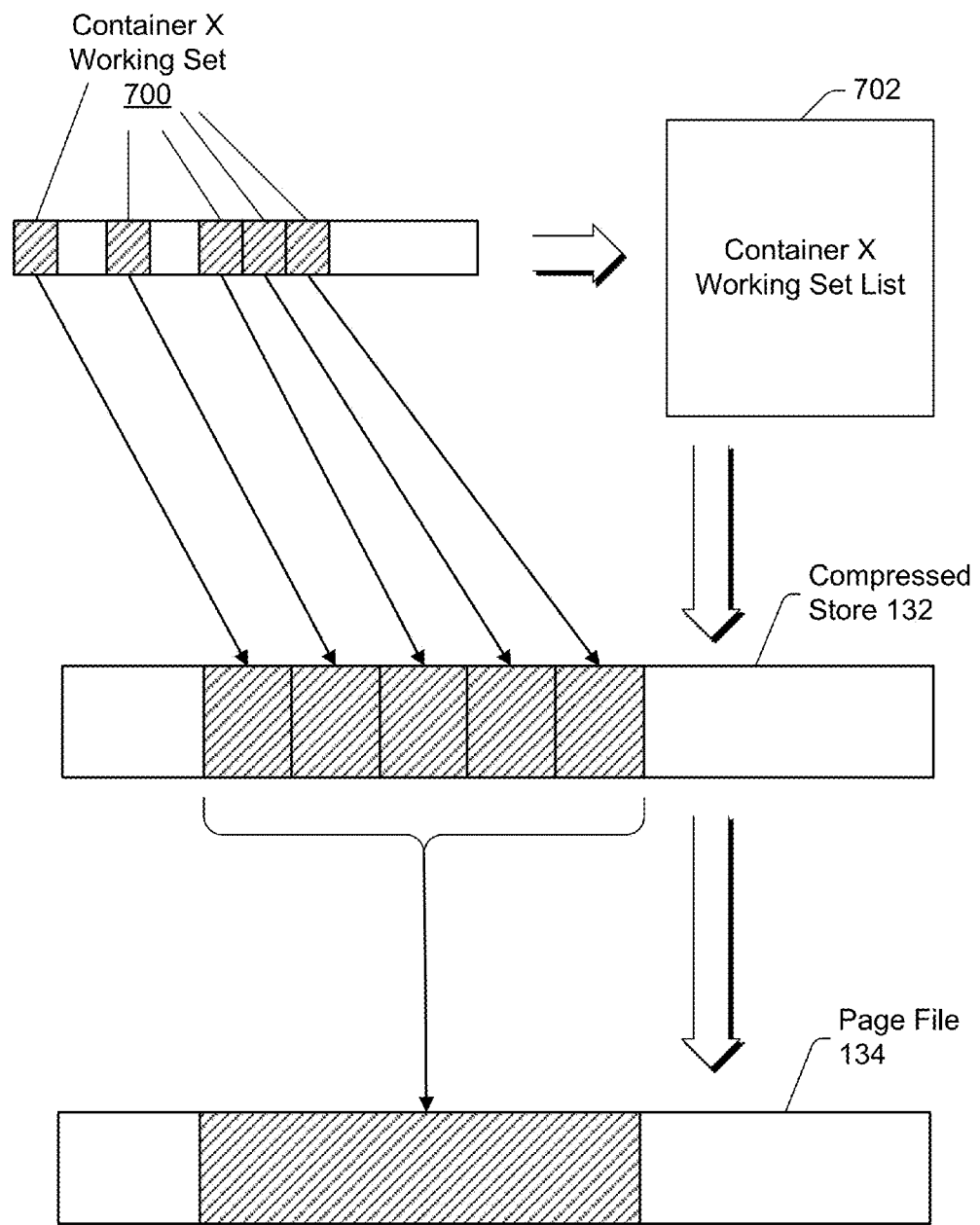
FIG. 7 shows an example of writing a working set of memory pages to a page file in accordance with one or more embodiments.

FIG. 7 shows an example of writing a working set of memory pages to a page file in accordance with one or more embodiments. In FIG. 7, a working set 700 of a particular container 120, Container X, is illustrated. Writing the memory pages of the container 700 is performed by generating a list 702 of memory pages, such as a list of starting virtual addresses and lengths (e.g., a count of sequential memory pages in the working set starting at that starting virtual address). The list is ordered sequentially, such as from smallest address to largest address (these addresses being virtual addresses of the memory space in which the process executes). The memory pages of the working set 700 are compressed in this same sequential ordering and written to the compressed store 132 in this same sequential ordering as shown. Thus, although the memory pages in the working set 700 may be non-contiguous in the working set 700, they are written into contiguous locations in the compressed store 132.

In one or more embodiments, the total size of the compressed store 132 is also determined and space reserved in the page file 134 sufficient to store the compressed store 132. Alternatively, rather than the total size of the compressed store 132, the size of the compressed memory pages from the working set 700 in the compressed store 132 is determined and space reserved in the page file 134 sufficient to store the compressed memory pages from the working set 700. Reserving space in the page file 134 refers to, for example, setting aside or marking part of the page file 134 as acceptable for the compressed store 132 (and/or memory pages of the container) to be written into, but unacceptable for other data to be written into. The reserving can be performed by, for example, the memory manager 114.

When the compressed store 132 is written to the page file 134, the compressed store 132 is written contiguously to the page file 134. The writing of pages into a contiguous, sequentially ordered, portion of the page file may enable a subsequent read operation to read a large, sequentially ordered block of the page file 134 when the pages are read back into working set 700.

It should be noted that, when reading memory pages from a page file, memory pages that have been retrieved from the page file can be decompressed while at the same time other memory pages are being read from the page file. Multiple threads, processors, and/or processor cores can be used to decompress memory pages and retrieve memory pages from the page file. For example, one thread running on one processor core in the system 100 can manage retrieval of the memory pages from the page file 134, and threads running concurrently or in parallel on the remaining processor cores in the system 100 (e.g., using all available CPU resources) can manage decompression of memory pages.

Additional discussion of virtualized containers is included in the following. It should be noted that the following discussion includes examples of virtualized containers, and that other techniques for implementing virtualized containers can additionally or alternatively be used.

Some embodiments described herein (e.g., embodiments using virtualized containers) use virtual memory allocated from a user-mode process on the host device (or other virtual memory allocation) to back a virtual machine's guest physical memory rather than using non-paged physical memory allocations on the host. This allows the host kernel's memory management (e.g., the memory manager 114 of FIG. 1) to manage the host physical memory associated with the guest physical memory. In particular, memory management logic that already exists in the host can be leveraged to manage the guest virtual machines' physical memory. The virtualized container can thus be backed by host process virtual memory that allows the memory manager 114 to perform the same virtual memory techniques or operations that process containers can receive (e.g., memory compression, page combining, swapping to page file, etc.). This can allow for the use of a smaller hypervisor (also referred to as a virtual machine monitor), in terms of the amount of code used to implement the hypervisor. A smaller hypervisor, which is the trusted portion between the host and the virtual machines, can be more secure than larger hypervisors as there is less code that can be exploited or that may have errors. Further, this allows for increased density on the host. Embodiments can use existing logic in a host memory manager to increase virtual machine density on the host by using less host physical memory to implement virtual machines than previously used.

In one or more embodiments, a user mode process is implemented in a host portion of the system 100 to provide virtual memory for backing guest virtual machines in a guest portion of the system 100. For example, a user mode process can be created for each virtualized container 120. Each such user mode process can be a process that can be managed by the memory manager 114 using the same virtual memory techniques or operations that process containers can receive (e.g., memory compression, page combining, swapping to page file, etc.).

Regular virtual memory in the address space of a designated user mode process that will host the virtual machine for a container is allocated. The host memory manager 114 can treat this memory as any other virtual allocation, which means that it can be paged, the physical page backing it can be changed (e.g., for the purposes of satisfying contiguous memory allocations elsewhere on the system), the physical pages can be shared with another virtual allocation in another process (which in-turn can be another virtual machine backing allocation or any other allocation on the system), and so forth. Additionally, variations are possible to have the memory manager 114 treat the virtual machine backing virtual allocations specially as appropriate.

A hypervisor (e.g., running on or implemented as part of the host operating system 102) manages the guest physical memory address ranges by utilizing SLAT (Second Level Address Translation) features in the hardware. The SLAT for a container is updated with the host physical memory pages that are backing the corresponding guest physical memory pages.

Thus, physical address space for a virtualized container is backed by host virtual memory (typically allocated in a host process' user address space), which is subject to regular virtual memory management by the memory manager 114. Virtual memory backing the virtual machine's physical memory can be of any type supported by the memory manager 114 (private allocation, file mapping, page file-backed section mappings, large page allocation, etc.) The memory manager 114 can perform its existing operations and apply policies on the virtual memory and/or apply specialized policies knowing that the virtual memory is backing virtual machine's physical address space as necessary.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 8:
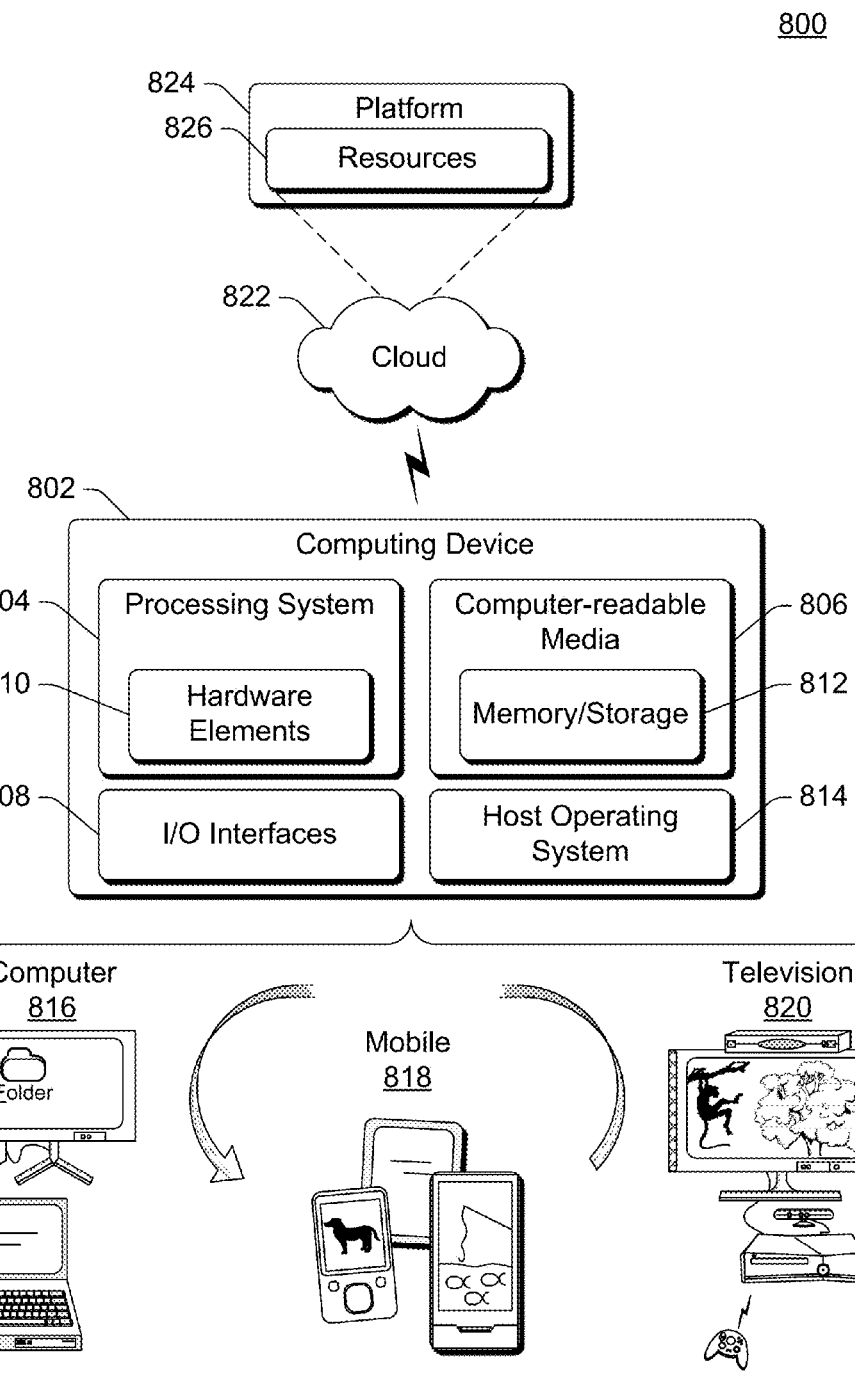
FIG. 8 illustrates an example system that includes an example computing device that is representative of one or more systems and/or devices that may implement the various techniques described herein.

FIG. 8 illustrates an example system generally at 800 that includes an example computing device 802 that is representative of one or more systems and/or devices that may implement the various techniques described herein. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Resistive RAM (ReRAM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

The one or more input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

The computing device 802 also includes a host operating system 814. The host operating system 814 provides various management of container pause and resume functionality, as discussed above. The host operating system 814 can implement, for example, the host operating system 102 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as a module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 802 may assume a variety of different configurations, such as for computer 816, mobile 818, and television 820 uses. Each of these configurations includes devices that may have generally different constructs and capabilities, and thus the computing device 802 may be configured according to one or more of the different device classes. For instance, the computing device 802 may be implemented as the computer 816 class of a device that includes a personal computer, desktop computer, a multi-screen computer, laptop computer, netbook, and so on.

The computing device 802 may also be implemented as the mobile 818 class of device that includes mobile devices, such as a mobile phone, portable music player, portable gaming device, a tablet computer, a multi-screen computer, and so on. The computing device 802 may also be implemented as the television 820 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This functionality may also be implemented all or in part through use of a distributed system, such as over a "cloud" 822 via a platform 824 as described below.

The cloud 822 includes and/or is representative of a platform 824 for resources 826. The platform 824 abstracts underlying functionality of hardware (e.g., servers) and software resources of the cloud 822. The resources 826 may include applications and/or data that can be utilized while computer processing is executed on servers that are remote from the computing device 802. Resources 826 can also include services provided over the Internet and/or through a subscriber network, such as a cellular or Wi-Fi network.

The platform 824 may abstract resources and functions to connect the computing device 802 with other computing devices. The platform 824 may also serve to abstract scaling of resources to provide a corresponding level of scale to encountered demand for the resources 826 that are implemented via the platform 824. Accordingly, in an interconnected device embodiment, implementation of functionality described herein may be distributed throughout the system 800. For example, the functionality may be implemented in part on the computing device 802 as well as via the platform 824 that abstracts the functionality of the cloud 822.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: receiving a first request to pause one of multiple containers of a computing device; suspending, in response to the first request, the container by no longer scheduling processes in the container for execution; receiving, subsequent to suspending the container, a second request to resume the container; and resuming, in response to the second request, scheduling of processes in the container for execution.

Alternatively or in addition to any of the above described methods, any one or combination of: the container comprising a process container for which an operating system of the computing device isolates the container from others of the multiple containers using namespace isolation; the container comprising a virtualized container that is run as a virtual machine, the virtualized container including one or more virtual processors, and the suspending the container comprising suspending the container by no longer scheduling the one or more virtual processors for execution; the method further comprising prepopulating, in response to the second request, a second level address table (SLAT) for the container; the method further comprising automatically performing one or more operations to reduce resource usage of the container in the computing device; the method further comprising reducing memory resource contention in the computing device resulting at least in part from the container by removing a working set of the container from physical memory to a page file on a persistent storage medium; the method further comprising swapping, while the container is suspended, memory pages of the container to a page file on a persistent storage medium sequentially; the method further comprising decompressing, in response to the second request, memory pages of the container using all available processor resources of the computing device; the computing device supporting multiple different levels of pause, the method further comprising presenting an interface to allow different ones of the multiple different levels of pause to be elected on a per container basis; the computing device supporting multiple different levels of pause, the method further comprising implementing the suspending and the resuming by a system of the computing device, the system further determining on its own an appropriate level of pause for a given container based on at least one factor including one or a combination of container idle time, container resource usage, and system resource utilization.

A system in a computing device, the system comprising: a container scheduler configured to schedule processes in multiple containers of the computing device for execution; a host compute service configured to receive, from a command interface, an indication of a request to pause a particular container of the multiple containers, the host compute service being further configured to communicate a first notification to the container scheduler to cease scheduling processes of the particular container for execution in response to the request to pause the particular container; the container scheduler being further configured to cease scheduling processes in the particular container for execution in response to the first notification from the host compute service; the host compute service further configured to receive, after receipt of the indication of the request to pause the particular container, from the command interface an indication of a request to resume the particular container, the host compute service being further configured to communicate a second notification to the container scheduler to resume scheduling processes of the particular container for execution in response to the request to resume the particular container; and the container scheduler being further configured to resume scheduling processes in the particular container for execution in response to the second notification from the host compute service.

Alternatively or in addition to any of the above described computing devices, any one or combination of: the system further comprising a memory manager configured to monitor resource utilization in the computing device, and determine, based on the resource utilization in the computing device, one or more container working sets to move from active physical memory of the computing device to a compressed store in physical memory of the computing device; the memory manager further configured to allow the particular container and one or more additional containers to share one or more compressed pages of memory in the compressed store; the host compute service being further configured to communicate a notification to the container scheduler to cease scheduling processes of the particular container for execution in response to determining that a first trigger or criteria is satisfied, and further configured to subsequently communicate a notification to resume scheduling processes in the particular container for execution in response to determining that a second trigger or criteria is satisfied; the computing device supporting multiple different levels of pause, the command interface further configured to receive an indication of different ones of the multiple different levels of pause on a per container basis.

A computing device comprising: one or more processors; and a computer-readable storage medium having stored thereon multiple instructions that, responsive to execution by the one or more processors, cause the one or more processors to: receive a first request to pause one of multiple containers of the computing device; suspend, in response to the first request, the container by ceasing scheduling processes in the container for execution; receive, after suspending the container, a second request to resume the container; and resume, in response to the second request, scheduling of processes in the container for execution.

Alternatively or in addition to any of the above described computing devices, any one or combination of: the container comprising a process container for which an operating system of the computing device isolates the container from others of the multiple containers using namespace isolation; wherein the multiple instructions further cause the one or more processors to remove memory pages of a suspended one of the multiple containers from physical memory of the computing device and write the removed memory pages to a page file on a persistent storage medium of the computing device; wherein the multiple instructions further cause the one or more processors to compress the memory pages of the suspended one of the multiple containers, and to write the compressed memory pages to the persistent storage medium; wherein the multiple instructions further cause the one or more processors to write the compressed memory pages of the suspended one of the multiple containers sequentially to a page file on the persistent storage medium.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
  receiving a first request to pause one of multiple containers running on a host operating system that is implemented by at least one computing device;
  suspending, in response to the first request, the container by leveraging scheduling functionality of the host operating system to no longer schedule all of the processes included in the container for execution;
  receiving, subsequent to suspending the container, a second request to resume the container;
  prepopulating, in response to the second request, a second level address table (SLAT) for the container, the SLAT used for implementing second level address translation, wherein a first level address table (FLAT) comprises addresses of SLATs that include the SLAT for the container, and wherein the prepopulating comprises prepopulating the SLAT with addresses of pages of the container; and
  resuming, in response to the second request, by using the scheduling functionality of the host operating system and the prepopulated SLAT, scheduling of the processes in the container for execution, wherein the container comprises a virtualized container that is run as a virtual machine, the virtualized container including one or more virtual processors, and the suspending the container comprising leveraging the scheduling functionality of the host operating system to no longer schedule the one or more virtual processors for execution.

2. The method as recited in claim 1, the container comprising a process container for which the host operating system isolates the container from others of the multiple containers using namespace isolation.

3. The method as recited in claim 1, further comprising automatically performing one or more operations to reduce resource usage of the container in the at least one computing device.

4. The method as recited in claim 1, further comprising reducing memory resource contention in the at least one computing device resulting at least in part from the container by removing a working set of the container from physical memory to a page file on a persistent storage medium.

5. The method as recited in claim 1, further comprising swapping, while the container is suspended, memory pages of the container to a page file on a persistent storage medium sequentially.

6. The method as recited in claim 1, further comprising decompressing, in response to the second request, memory pages of the container using all available processor resources of the at least one computing device.

7. The method as recited in claim 1, the at least one computing device supporting multiple different levels of pause, the method further comprising presenting an interface to allow different ones of the multiple different levels of pause to be elected on a per container basis.

8. The method as recited in claim 1, the at least one computing device supporting multiple different levels of pause, the method further comprising implementing the suspending and the resuming by a system of the at least one computing device, the system further determining on its own an appropriate level of pause for a given container based on at least one factor including one or a combination of container idle time, container resource usage, and system resource utilization.

9. A system in a computing device, the system comprising:
  a container scheduler, implemented in hardware of the computing device, configured to schedule processes in multiple containers of the computing device for execution, wherein the containers comprise virtualized containers that are run as respective virtual machines, the virtualized containers having one or more respective virtual processors;
  a memory manager, implemented in the hardware of the computing device, configured to handle memory compression for the multiple containers;
  a host compute service, implemented in the hardware of the computing device, configured to receive, from a command interface, an indication of a request to pause a particular container of the multiple containers, the host compute service being further configured to communicate a first notification to the container scheduler to cease scheduling the virtual processors of the particular container for execution and a second notification to the memory manager to compress memory of the particular container in response to the request to pause the particular container;
  the container scheduler being further configured to cease scheduling the virtual processors of the particular container for execution in response to the first notification from the host compute service;
  the memory manager being further configured to compress the memory of the particular container in response to the second notification from the host compute service;
  the host compute service further configured to receive, after receipt of the indication of the request to pause the particular container, from the command interface an indication of a request to resume the particular container, the host compute service being further configured to communicate a third notification to the container scheduler to resume scheduling virtual processors of the particular container for execution and a fourth notification to the memory manager to decompress the memory of the particular container in response to the request to resume the particular container;
  the container scheduler being further configured to, in response to the second notification, prepopulate a second level address table (SLAT) for the particular container, the SLAT used for implementing second level address translation, wherein a first level address table (FLAT) comprises addresses of SLATs that include the SLAT for the particular container, and wherein the prepopulating comprises prepopulating the SLAT with addresses of pages of the particular container; and
  the container scheduler further configured to, in response to the second notification, use the prepopulated SLAT to resume scheduling virtual processors of the particular container for execution; and the memory manager being further configured to decompress the memory of the particular container in response to the fourth notification from the host compute service.

10. The system as recited in claim 9, the memory manager further configured to monitor resource utilization in the computing device, and determine, based on the resource utilization in the computing device, one or more container working sets to move from active physical memory of the computing device to a compressed store in physical memory of the computing device.

11. The system as recited in claim 10, the memory manager further configured to allow the particular container and one or more additional containers to share one or more compressed pages of memory in the compressed store.

12. The system as recited in claim 9, the host compute service being further configured to communicate a notification to the container scheduler to cease scheduling processes of the particular container for execution in response to determining that a first trigger or criteria is satisfied, and further configured to subsequently communicate a notification to resume scheduling processes in the particular container for execution in response to determining that a second trigger or criteria is satisfied.

13. The system as recited in claim 9, the computing device supporting multiple different levels of pause, the command interface further configured to receive an indication of different ones of the multiple different levels of pause on a per container basis.

14. A computing device comprising:
one or more processors; and
a computer-readable storage medium having stored thereon multiple instructions that, responsive to execution by the one or more processors, cause the one or more processors to:
receive a first request to pause one of multiple containers running on a host operating system, wherein the container to be paused comprises a virtualized container that is run as a virtual machine, the virtualized container including one or more virtual processors, and the suspending the container comprising leveraging the scheduling functionality of the host operating system to no longer schedule the one or more virtual processors for execution;
suspend, in response to the first request, the container by using scheduling functionality of the host operating system to cease scheduling any processes included in the container for execution;
receive, after suspending the container, a second request to resume the container;
prepopulating, in response to the second request, a second level address table (SLAT) for the container, the SLAT used for implementing second level address translation, wherein a first level address table (FLAT) comprises addresses of SLATs that include the SLAT for the container, and wherein the prepopulating comprises prepopulating the SLAT with addresses of pages of the container; and
resume, in response to the second request, by using the scheduling functionality of the host operating system and the prepopulated SLAT, scheduling all of the processes in the container for execution.

15. The computing device as recited in claim 14, the container comprising a process container for which the host operating system isolates the container from others of the multiple containers using namespace isolation.

16. The computing device as recited in claim 14, the multiple instructions further causing the one or more processors to remove memory pages of a suspended one of the multiple containers from physical memory of the computing device and write the removed memory pages to a page file on a persistent storage medium of the computing device.

17. The computing device as recited in claim 16, the multiple instructions further causing the one or more processors to compress the memory pages of the suspended one of the multiple containers, and to write the compressed memory pages to the persistent storage medium.

18. The computing device as recited in claim 17, the multiple instructions further causing the one or more processors to write the compressed memory pages of the suspended one of the multiple containers sequentially to a page file on the persistent storage medium.

* * * * *